April 16, 1968   J. W. WINZELER ETAL   3,378,391
METHOD FOR COATING PLASTICS ONTO A SUBSTRATE EMPLOYING A PLASMA
Filed Dec. 20, 1962
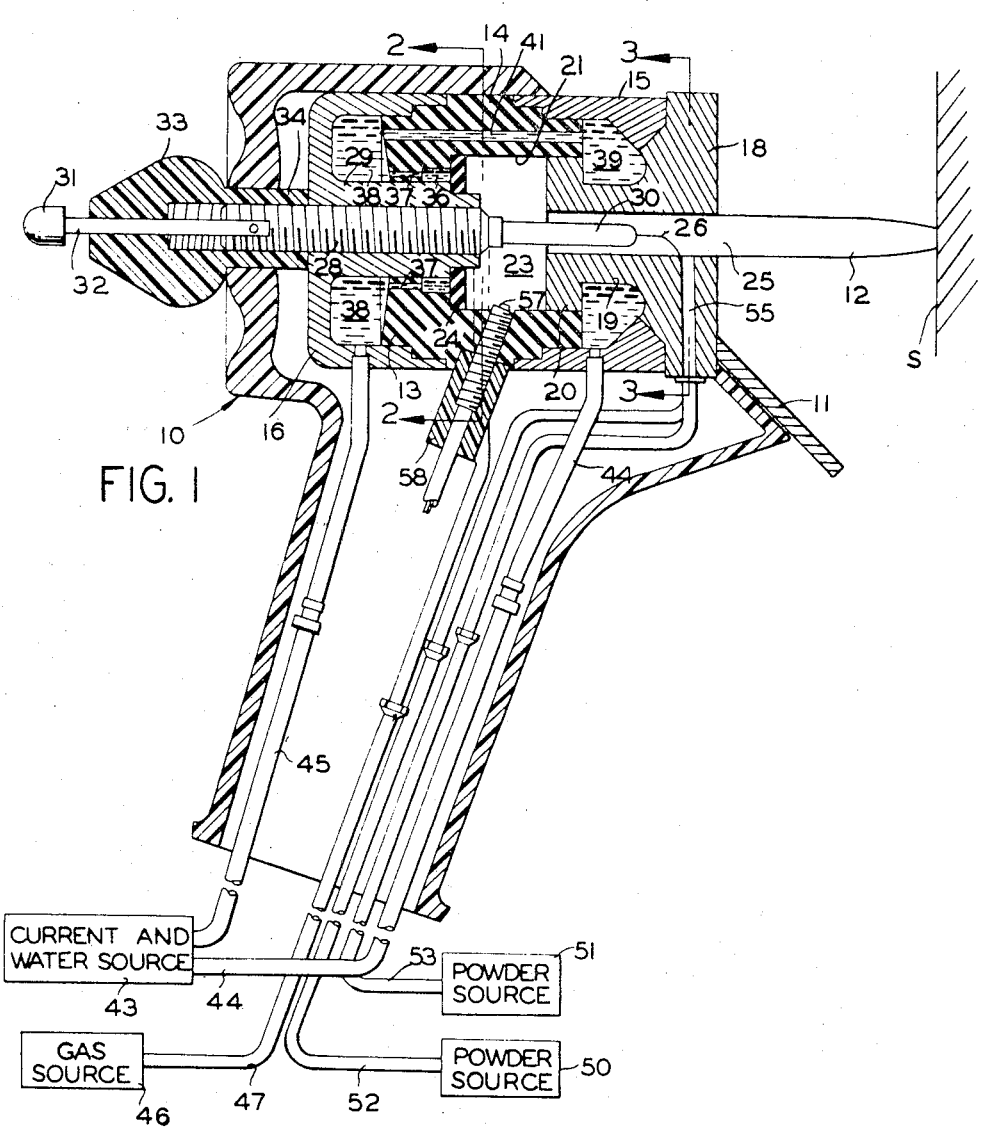
FIG. 1
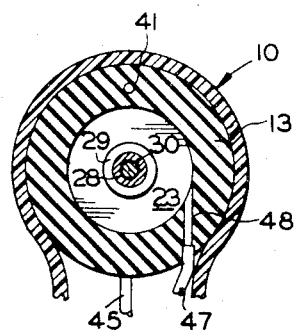
FIG. 2
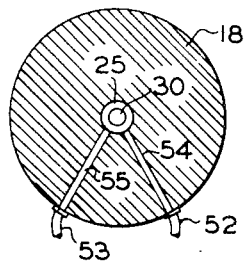
FIG. 3
INVENTOR.
JOHN W. WINZELER
JAMES F. TUCKER
BY
ATTORNEY

United States Patent Office 3,378,391
Patented Apr. 16, 1968

3,378,391
METHOD FOR COATING PLASTICS ONTO A SUBSTRATE EMPLOYING A PLASMA
John W. Winzeler and James F. Tucker, Santa Ana, Calif., assignors, by mesne assignments, to Giannini Scientific Corporation, Amityville, N.Y., a corporation of Delaware
Continuation-in-part of application Ser. No. 126,402, June 13, 1961. This application Dec. 20, 1962, Ser. No. 246,170
The portion of the term of the patent subsequent to Apr. 20, 1982, has been disclaimed
3 Claims. (Cl. 117—93.1)

This invention relates to a method of applying plastic coatings to a substrate. The present application is a continuation-in-part of our co-pending patent application Ser. No. 126,402, now Patent No. 3,183,337 filed June 13, 1961, for Electrical Plasma-Jet Spray Torch and Method.

An object of the present invention is to provide a method of spraying various plastics by means of an electrical plasma-jet torch, thereby making it simple, economical and commercially practical to plastic coat numerous objects and substrates relative to which plastic coating was not previously possible and/or practical.

This and other objects and advantages of the invention will be more fully set forth in the following specification and claims, considered in connection with the attached drawing to which they relate.

In the drawing:

FIGURE 1 is a longitudinal central sectional view illustrating an electrical plasma-jet spray torch adapted to effect plastic coating in accordance with the present invention;

FIGURE 2 is a transverse section taken on line 2—2 of FIGURE 1; and

FIGURE 3 is a transverse section taken on line 3—3 of FIGURE 1.

Referring to the drawing, an electrical plasma-jet spray torch is illustrated to comprise a unitary casing and handle 10 formed of a suitable insulating plastic. The handle portion of element 10 is hollow and is sufficiently large to receive conduits leading from suitable sources of current, water, gas and spray material. The casing is provided with a suitable metal shield 11 between the plasma jet 12 and the handle, such shield serving to protect from the intense heat of the plasma jet the hand of the operator holding the apparatus.

The apparatus further comprises an insulating body 13, preferably formed of a suitable plastic such as a phenolic, having a central flange portion 14 the cylindrical outer wall of which abuts the interior cylindrical wall of casing 10. Abutted against the forward surface of flange portion 14 is a front housing element 15 having a generally annular shape. Such element may be formed of brass or other suitable electrical conductor. Abutted against the rear surface of flange portion 14 is the rim of a generally cup-shaped rear housing element 16 which is also formed of brass or other suitable conductor.

A front electrode element 18, which is preferably formed of copper, has its generally disc-shaped forward portion abutted sealingly against front housing element 15. The stem portion 19 of the front electrode extends inwardly toward the rear housing element, having a flanged portion 20 which abuts the inner surface 21 of the phenolic body 13. Such inner surface 21 is cylindrical in shape and defines the outer portion of a vortex chamber 23 into which gas is introduced tangentially as will be stated hereinafter. The front portion of such vortex chamber is defined by stem 19, including its flange 20, whereas the rear portion of the chamber is defined by a disc 24 formed of a suitable insulating material.

The vortex chamber 23 communicates with, and is coaxial with, a nozzle passage 25 which is bored centrally through the nozzle electrode. Such nozzle passage permits discharge of gas from the vortex chamber 23 to the ambient atmosphere and in the form of the plasam jet 12, it being understood that the temperature of the plasma jet depends upon several factors including the location and magnitude of an electric arc 26 which is maintained between the interior wall of nozzle passage 25 and the tip of a rear electrode assembly next to be described.

The rear electrode assembly comprises an externally-threaded adjustment shaft or rod 28 formed of copper or other suitable conductor, such shaft or rod being threaded into an internally-threaded bore through a stem portion 29 of the rear housing element 16. Soldered coaxially at the extreme front end of the threaded shaft 28 is a rear electrode rod 30 preferably formed of thoriated tungsten. The rod 30 has a diameter substantially smaller than the nozzle passage 25 with which it is coaxial, so that the vortically-flowing gas may pass forwardly from chamber 23 to create the plasma jet 12. An insulating adjustment knob 31 is non-rotatably connected through a rod 32 to the rear end of shaft 28, so that turning of the knob 31 operates through the shaft 28 to move the tip of electrode rod 30 either forwardly or rearwardly.

A lock knob 33, preferably formed of a suitable insulating plastic, is internally threaded to mate with the outer end of adjustment shaft 28, and is also bored to slidably receive the rod 32. An inner or stem portion 34 of knob 33 extends slidably through casing 10 and abuts the outer surface of rear housing 16. The lock knob 33, when manually rotated after the electrode position has been adjusted, operates in the manner of a lock nut to prevent rotation of shaft 28. Furthermore, the lock nut jams the threads of elements 28 and 29 tightly against each other to prevent arcing therebetween.

The stem portion 29 of the rear housing extends through a bore in body 13, and also through a somewhat smaller opening in disc 24, to the vortex chamber 23. A counterbore 36 is provided around the stem 29, inwardly adjacent disc 24, and communicates through passages 37 with a coolant chamber 38 which is defined by the interior surfaces of the rear housing element 16 and by the rear radial surface of body 13. A second coolant chamber 39 is defined around the nozzle passage 25 by stem 19 (including its flange 20), by the front edge or rim of body 13, and by the interior surface of front housing 15. The main coolant chambers 38 and 39 communicate with each other through a passage 41 which extends through body 13 radially-outwardly of vortex chamber 23. The passages 37 permit circulation of water from the rear coolant chamber 38 to the annulus formed by counterbore 36, so that the forward portion of stem 29 is cooled.

Proceeding next to a description of the various supply sources, and associated elements, a suitable source (or sources) of both current and water is indicated schematically at 43. Such source is connected through water-conducting cables 44 and 45 (such as insulating plastic water conduits containing large electrical conductors) to the front and rear housing elements 15 and 16, respectively. Water is thus fed from source 43 to coolant chamber 39 in the front electrode, from which it flows through passage 41 to rear coolant chamber 38 and the associated counterbore 36, after which it discharges through the cable 45 to a suitable drain.

The electricity which passes through cables 44 and 45 can only flow between the electrodes in the form of the arc 26, since the water which flows through passage 41 has a high electrical resistance. Thus, the electrical circuit comprises current and water source 43, cable 44, front housing element 15, front electrode 18, arc 26, rear electrode rod 30, adjustment shaft 28, rear housing element 16, and cable 45 back to source 43. The current source is normally a D.C. source adapted to deliver very large currents at relatively low voltages. The polarity of the source is normally such that nozzle electrode 18 is positive, and rear electrode rod 30 is negative.

A suitable source 46 of gas under pressure is schematically indicated in FIGURE 1, being connected through a conduit 47 to a passage 48 (FIGURE 2) which extends through body 13 and is tangential to the gas vortex chamber 23. Gas is thus introduced from source 46 into the chamber, where it whirls at substantial velocity and then passes forwardly through nozzle passage 25 in a vortical or helical manner around electrode rod 30.

The illustrated means for introducing spray material into the plasma jet 12 comprises a plurality of sources 50 and 51 of powdered plastic. It is to be understood, however, that it is also possible to employ only a single powder source, or more than two sources. Powder sources 50 and 51 are connected, respectively, to conduits 52 and 53 which extend through the handle portion of casing 10 to passages or ports 54 and 55 (FIGURE 3) in front electrode 18. Passages 54 and 55 communicate with nozzle passage 25 at points which lie generally in a single plane perpendicular to the axis of passage 25. Such plane is spaced a short distance from the forward radial surface of electrode 18, the distance being insufficient to result in deposition of spray material in the outer or forward end of passage 25. The passages 54 and 55, at least at their points adjacent passage 25, are substantially radial to the axis thereof.

Each of the powder sources 50 and 51 includes a suitable source of propellant gas, and means to mix such gas with the powder, so that the powder is propelled by the gas through the associated conduit and into nozzle passage 25. Thus, for example, the propellant gas in each source may be introduced into a chamber containing spray powder, so that a portion of the powder becomes entrained in the gas and is carried thereby to the nozzle passage.

The remaining component of the torch comprises a spark plug element 57 which is threaded or force-fit into phenolic body 13, being illustrated as inclined toward the inner surface of nozzle electrode 18. A lock nut 58 is threaded over the outer portion of spark plug 57 and is adapted to maintain the same in the desired adjusted position. The spark plug cooperates with front electrode 18 in generating a spark in vortex chamber 23, so that the gas therein becomes ionized and may be employed to initiate an arc between electrode rod 30 and the wall of nozzle passage 25.

*Method of spraying plastics in accordance with the present invention*

The method is performed by initiating and maintaining the electric arc 26 in the nozzle passage 25, while introducing gas from source 46 so that the plasma jet 12 is created. The various parameters are so regulated that the particular plastic or plastics to be introduced through passages 54 and 55 will be melted, but not decomposed or adversely affected in any way, by the heat of jet 12.

More specifically, the back electrode 30 is moved rearwardly sufficiently far that the downstream footpoint thereof is located a substantial distance upstream from the passages 54 and 55. Thus, the entire arc 26 is spaced substantially upstream from the point or points of materials introduction, so that the plastic is not deteriorated by the intense heat of the arc.

The rate of flow of gas from source 46, and the electrical power supplied to the arc, are also regulated to such values that the plastic substance or substances will not disintegrate but instead merely melt. Thus, the electrical power may be relatively low, and the gas flow rate relatively high.

The plastic powder is introduced, by means of a suitable propellant gas, from sources 50 and 51 into passages 54 and 55 and thence into the plasma jet 12. The powder is melted by the jet 12 and impinged against the substrate S. It then cools and solidifies on the substrate, so that a coating is formed thereon.

The plastic substance may comprise, for example, an epoxy resin containing a suitable catalyst as in the fluidized bed process. The plastic may also comprise polyethylene, nylon, and numerous others.

The gas introduced from source 46 may comprise argon, nitrogen, or various others. The same or other gases may be employed to propel the plastic powder from sources 50 and 51.

As one specific example of the present method, let it be assumed that it is desired to spray an epoxy resin onto the substrate S. The power supplied to the arc may be 150 amperes at 35 volts.

The rate of flow of propellant gas is 0.3 c.f.m. in each of the systems, both of which contain epoxy powder of the type employed in fluidized bed techniques. Such powder incorporates (in powder form) a catalyst or hardener which melts and becomes active at a temperature lower than that of the plasma jet 12. The rate of arc gas flow through passage 48 may be 1.3 c.f.m. Very importantly, the electrode 30 is disposed in a retracted position, so that the downstream arc footpoint is (unlike the footpoint position shown in the drawing) spaced upstream from the plane of passages 54 and 55. This spacing may be approximately one-half inch. When the epoxy-catalyst powder enters the jet 12, it melts and subsequently hardens on substrate S.

The present invention, and all of the appended claims, are to be construed as limited to plastics which, upon an increase in temperature, melt before they deteriorate. Thus, for example, a plastic which burns while still in solid form is not within the scope of any claim.

Various embodiments of the present invention, in addition to what has been illustrated and described in detail, may be employed without departing from the scope of the accompanying claims.

We claim:

1. A method of applying a plastic onto a substrate, which comprises providing an electrical plasma-jet torch having a nozzle passage, supplying gas and electrictiy to said torch and generating an electric arc therein with consequent formation of a plasma jet which emanates from said nozzle passage, directing said jet toward a substrate which it is desired to coat with a plastic, providing a plastic, regulating the parameters of said torch in such manner that the region of said nozzle passage which is relatively adjacent said substrate does not contain any portion of said electric arc and is at a temperature insufficiently highto effect deterioration of said plastic but sufficiently high to melt the same, and introducing said plastic into said nozzle passage at said region thereof which is relatively adjacent said substrate whereby said plastic is melted therein and entrained in said jet for impingement against said substrate, said plastic then solidifying on said substrate to form a coating thereon.

2. The invention as claimed in claim 1, in which said plastic is provided in powder form.

3. The invention as claimed in claim 1, in which said plastic is a powdered epoxy resin containing therein a catalyst in powder form.

References Cited

UNITED STATES PATENTS

| | | | |
|---|---|---|---|
| 3,090,696 | 5/1963 | Gemmer | 117—21 |
| 3,179,784 | 4/1965 | Johnson | 117—93.4 |
| 3,183,337 | 5/1965 | Winzler et al. | 219—76 |

ALFRED L. LEAVITT, *Primary Examiner.*

RICHARD D. NEVIUS, *Examiner.*

A. GOLIAN, *Assistant Examiner.*